(12) United States Patent
Iwao et al.

(10) Patent No.: US 10,759,279 B2
(45) Date of Patent: Sep. 1, 2020

(54) VEHICLE INCLUDING INSTRUMENT PANEL AND INTERIOR MEMBER

(71) Applicant: MAZDA MOTOR CORPORATION, Hiroshima (JP)

(72) Inventors: Norihito Iwao, Hiroshima (JP); Seiji Sekine, Yokohama (JP); Daiki Hamanaga, Aki-gun (JP); Jun Maruyama, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 187 days.

(21) Appl. No.: 16/118,315

(22) Filed: Aug. 30, 2018

(65) Prior Publication Data

US 2019/0084422 A1 Mar. 21, 2019

(30) Foreign Application Priority Data

Sep. 20, 2017 (JP) ................................ 2017-179833

(51) Int. Cl.
| | |
|---|---|
| *B60K 37/02* | (2006.01) |
| *B60Q 3/14* | (2017.01) |
| *B60Q 3/12* | (2017.01) |
| *B62D 25/14* | (2006.01) |
| *B60Q 3/10* | (2017.01) |
| *B60K 35/00* | (2006.01) |

(52) U.S. Cl.
CPC ............. *B60K 37/02* (2013.01); *B60K 35/00* (2013.01); *B60Q 3/10* (2017.02); *B60Q 3/12* (2017.02); *B60Q 3/14* (2017.02); *B62D 25/14* (2013.01); *B60K 2370/27* (2019.05)

(58) Field of Classification Search
CPC ... B60Q 3/14; B60Q 3/12; B60Q 3/10; B62D 25/14; B60K 37/02; B60K 37/04
USPC .......................................................... 296/70
See application file for complete search history.

(56) References Cited

U.S. PATENT DOCUMENTS

| | | | |
|---|---|---|---|
| 4,635,033 A * | 1/1987 | Inukai .................... | B60K 37/00 353/14 |
| 2009/0261612 A1 | 10/2009 | Takayama et al. | |
| 2014/0125085 A1* | 5/2014 | Wakibayashi ......... | B60K 37/02 296/70 |
| 2015/0243046 A1 | 8/2015 | Yoshida et al. | |
| 2019/0255948 A1* | 8/2019 | Dinant ................... | B60K 37/02 |
| 2019/0344664 A1* | 11/2019 | Koller ................ | G06K 9/00845 |
| 2019/0384480 A1* | 12/2019 | Lee .......................... | B60K 35/00 |

(Continued)

FOREIGN PATENT DOCUMENTS

| | | |
|---|---|---|
| JP | 2009-280194 A | 12/2009 |
| JP | 2015-180041 A | 10/2015 |

*Primary Examiner* — Jason S Morrow
(74) *Attorney, Agent, or Firm* — Studebaker & Brackett PC (57) ABSTRACT

A vehicle includes a driver's seat and a passenger's seat, an interior member, and an instrument panel. The instrument panel has a meter cluster portion and an information display portion. The interior member has, on a front side of the vehicle, a extending portion extending around a back side of the information display portion so as to be spaced from the information display portion, and the information display portion has a panel capable of displaying at least either one information of images or characters, and at least when the information is not displayed, enters a light transmission state so as to allow a driver to visually recognize the extending portion.

20 Claims, 9 Drawing Sheets

(56) References Cited

U.S. PATENT DOCUMENTS

| | | | |
|---|---|---|---|
| 2020/0034102 A1* | 1/2020 | Hirota | G02B 27/0101 |
| 2020/0057317 A1* | 2/2020 | Weindorf | B60K 37/02 |
| 2020/0114762 A1* | 4/2020 | Shigefuji | B60R 11/04 |
| 2020/0114832 A1* | 4/2020 | Shigefuji | B60R 1/00 |

* cited by examiner

VEHICLE INCLUDING INSTRUMENT PANEL AND INTERIOR MEMBER

TECHNICAL FIELD

The present invention relates to a vehicle including an instrument panel and an interior member.

BACKGROUND ART

Japanese Patent Application Laid-Open No. 2009-280194 discloses a vehicle including an instrument panel provided to extend from a steering wheel in front of a driver's seat to a central portion in a vehicle width direction, and a center console provided to extend from a part between the driver's seat and a passenger's seat to a lower end portion of the instrument panel in a front-rear direction of the vehicle. In the vehicle disclosed in Japanese Patent Application Laid-Open No. 2009-280194, an image display portion is provided, in a central portion of the instrument panel in the vehicle width direction, in a region at generally the same level of a position of an upper end of the steering wheel.

Japanese Patent Application Laid-Open No. 2015-180041 discloses a technique of controlling display of a display portion by presuming an optical flow based on a front scenery image captured by an outside camera and setting an additive-display-line according to the optical flow. In the technique disclosed in Japanese Patent Application Laid-Open No. 2015-180041, adoption of the above configuration allows a driver to recognize an additive-display-line taking an optical flow into consideration, so that the driver's attention can be attracted to the display portion easily.

However, the techniques disclosed in Japanese Patent Application Laid-Open No. 2009-280194 and Japanese Patent Application Laid-Open No. 2015-180041 still have room for further improvement in terms of relief of driver's fatigue and designability of a vehicle compartment. In other words, although it is crucial to create spaciousness of a vehicle compartment in terms of relief of driver's fatigue and designability of a vehicle compartment, the techniques disclosed in Japanese Patent Application Laid-Open No. 2009-280194 and Japanese Patent Application Laid-Open No. 2015-180041 have room for improvement in this respect.

SUMMARY OF INVENTION

An object of the present invention, which has been devised to solve the above-described problem, is to provide a vehicle which realizes relief of driver's fatigue and excellent designability by creating spaciousness of a vehicle compartment.

A vehicle according to one aspect of the present invention includes a driver's seat and a passenger's seat disposed on a floor panel so as to be spaced from each other in a vehicle width direction; an interior member disposed to extend from between the driver's seat and the passenger's seat toward a front side of the vehicle; and an instrument panel disposed below a front window shield to extend in the vehicle width direction, and having a meter cluster portion disposed in front of a steering wheel and an information display portion disposed closer to a center in the vehicle width direction than the meter cluster portion, in which the interior member has, on the front side of the vehicle, a extending portion extending around a back side of the information display portion so as to be spaced from the information display portion, and the information display portion has a panel capable of displaying at least either one information of images or characters, and at least when the information is not displayed, enters a light transmission state so as to allow a driver to visually recognize the extending portion.

DESCRIPTION OF EMBODIMENT

In the following, an embodiment of the present invention will be described with reference to the drawings. The embodiment described in the following is one example of the present invention and the present invention is not limited to any of the following embodiment except for a fundamental configuration thereof.

The respective indications "UP", "LO", "FR", "RE", "LE", and "RI" to be used in the drawings represent "upward", "lower", "front", "rear", "left", and "right" recognized by a driver on a driver's seat, respectively.

Embodiment

1. Vehicle 1

Description will be made of a vehicle 1 according to an embodiment, in particular, a vehicle compartment structure of the vehicle 1 with reference to FIG. 1.

Figure 1:
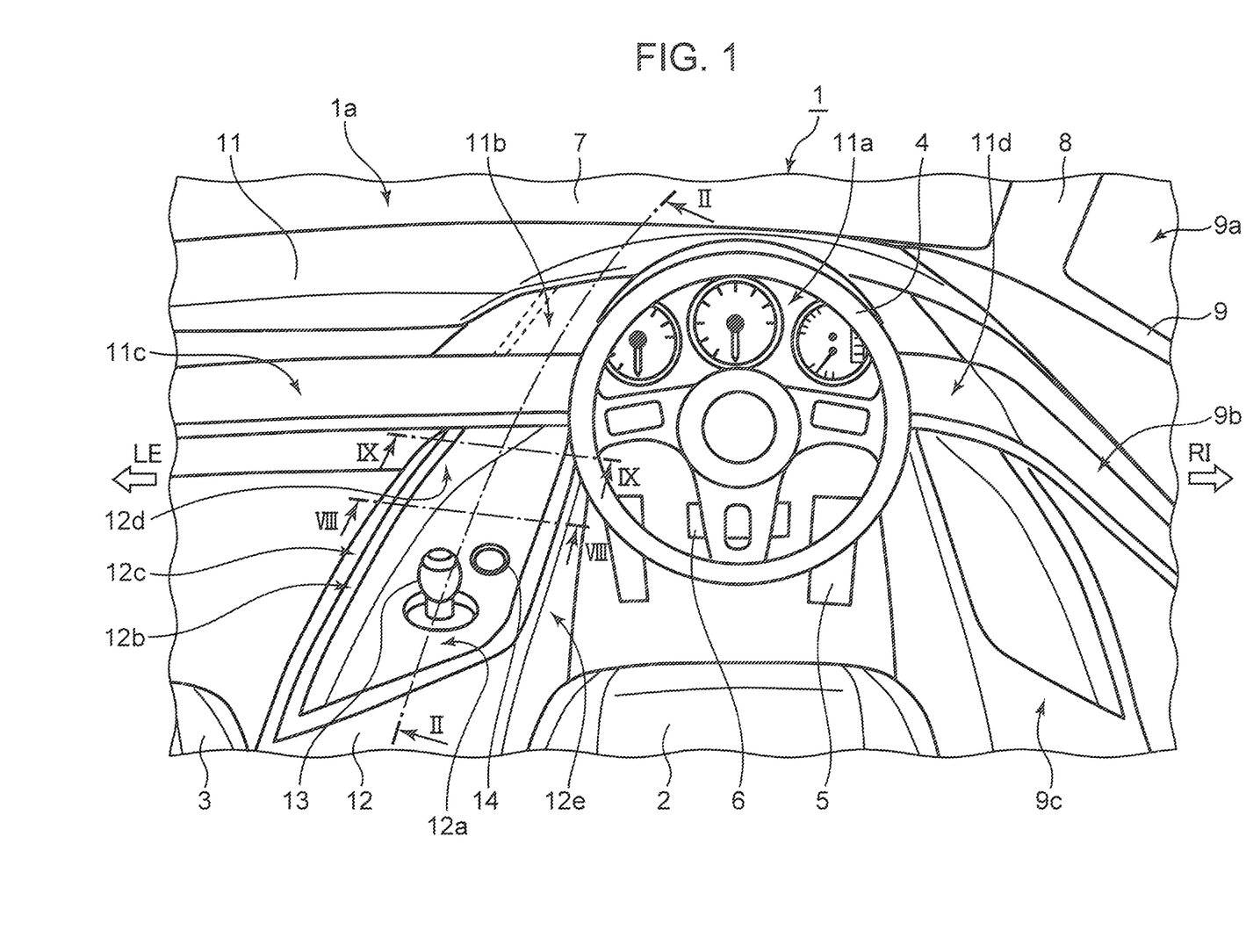
FIG. 1 is a schematic view showing a part of a vehicle compartment structure of a vehicle according to an embodiment.

As shown in FIG. 1, a driver's seat 2 and a passenger's seat 3 are provided in a vehicle compartment 1a of the vehicle 1. The driver's seat 2 and the passenger's seat 3 are disposed spaced from each other in a vehicle width direction. In the present embodiment, the driver's seat is disposed on a right side and the passenger's seat is disposed on a left side as one example of a so-called right-hand drive vehicle 1.

A steering wheel 4 is provided on a front side of the driver's seat 2 in the vehicle. The steering wheel 4 is disposed at a height of a chest of a driver sitting on the driver's seat 2.

An accelerator pedal 5 and a brake pedal 6 are provided in a floor part below the driver's seat 2 in the front side of the vehicle. The accelerator pedal 5 is disposed at a position where a right foot of a driver sitting on the driver's seat 2 is placed, and the brake pedal 6 is disposed slightly closer to a center in the vehicle width direction than the accelerator pedal 5.

A front window shield 7 is disposed in the front side of the vehicle compartment 1a of the vehicle. The front window shield 7 is formed of, for example, a laminated glass. Then, a front pillar 8 is provided at a part adjacent to a right end portion of the front window shield 7 in the vehicle width direction.

The front pillar 8 is a part between the front window shield 7 and a side door 9. The side door 9 has a door glass 9a configured to be movable up and down according to operation of a passenger, a door trim 9b forming an inner face of the side door 9, and an arm rest 9c on which an arm of the driver is placed.

An instrument panel 11 is provided in a region from a lower end portion of the front window shield 7 to the front of the steering wheel 4. The instrument panel 11 is provided to extend from a front pillar (not shown) on the left in the vehicle width direction to the front pillar 8 on the right.

The instrument panel 11 has a meter cluster portion 11a provided in a part corresponding to the front of the steering wheel 4, an information portion (an information display portion) 11b provided closer to the center in the vehicle width direction than the steering wheel 4, a trim portion 11c provided to extend from below a left front pillar (not shown) to the meter cluster portion 11a, and a trim portion 11d provided to extend from the meter cluster portion 11a to below the right side front pillar 8.

The trim portion 11c and the trim portion 11d of the instrument panel 11 are provided at the same level of height in a height direction of the vehicle so as to allow passengers to feel a sense of unity.

The trim portion 11c is provided to appear to continue to a door trim portion of a left-side side door (not shown), and the trim portion 11d is provided to appear to continue to the door trim portion of the right-side side door 9. In the present embodiment, the trim portions 11c and 11d of the instrument panel 11, and the door trim portion of the left-side side door and the door trim portion 9b of the right-side side door 9 are unified in color and texture to enable a passenger to feel a sense of unity in the vehicle compartment 1a.

A center console 12 extending from a part between the driver's seat 2 and the passenger's seat 3 toward the front of the vehicle is provided on the floor. The center console 12 is one example of an interior member and has a main face portion 12a as an upper face thereof on which a shift knob 13 and a start switch 14 are disposed. The shift knob 13 and the start switch 14 are disposed at a position where a driver sitting on the driver's seat 2 places his/her left hand.

As shown in FIG. 1, an outer-side upper end surface portion 12b of the center console 12 on the passenger's seat 3 side is provided to have a smooth curved shape directed to an imaginary position (focus of expansion) slightly above an upper end portion of the steering wheel 4 from the part between the driver's seat 2 and the passenger's seat 3 toward the front side of the vehicle.

The focus of expansion is a point of intersection of a motion vector on the front window shield 7 according to motion of an object when the vehicle 1 advances.

In the vehicle 1, the arm rest 9c of the side door 9 is also configured to be slowly curved so as to be bilaterally symmetrical with the curve of the outer-side upper end surface portion 12b of the center console 12.

As shown in FIG. 1, an outer-side outer surface portion 12c of the center console 12 on the passenger's seat 3 side is configured such that an upper portion thereof inclines rightward in the vehicle width direction (the driver's seat side) with respect to the floor side. Then, the outer-side outer surface portion 12c is configured to have a larger inclination toward the front side of the vehicle from the rear side of the vehicle.

An outer-side inner surface portion 12d continuous to the right side of the outer-side upper end surface portion 12b in the vehicle width direction is provided to spread from a position abutting on the outer-side upper end surface portion 12b toward a bottom side of the vehicle so as to locate on the driver's seat side. Then, the outer-side inner surface portion 12d is configured to slowly incline from the rear side of the vehicle toward the front side of the vehicle.

On the other hand, an inner-side outer surface portion 12e of the center console 12 on the driver's seat 2 side is configured to have a shape rising more steeply, nearly vertically, than the outer-side outer surface portion 12c. This ensures a spacious space at driver' feet. The inner-side outer surface portion 12e is also configured to have a smooth curved shape directed to a position (focus of expansion) slightly above the upper end portion of the steering wheel 4 from the part between the driver's seat 2 and the passenger's seat 3 toward the front side of the vehicle.

2. Arrangement of Center Console 12 with Respect to Instrument Panel 11

Figure 2:
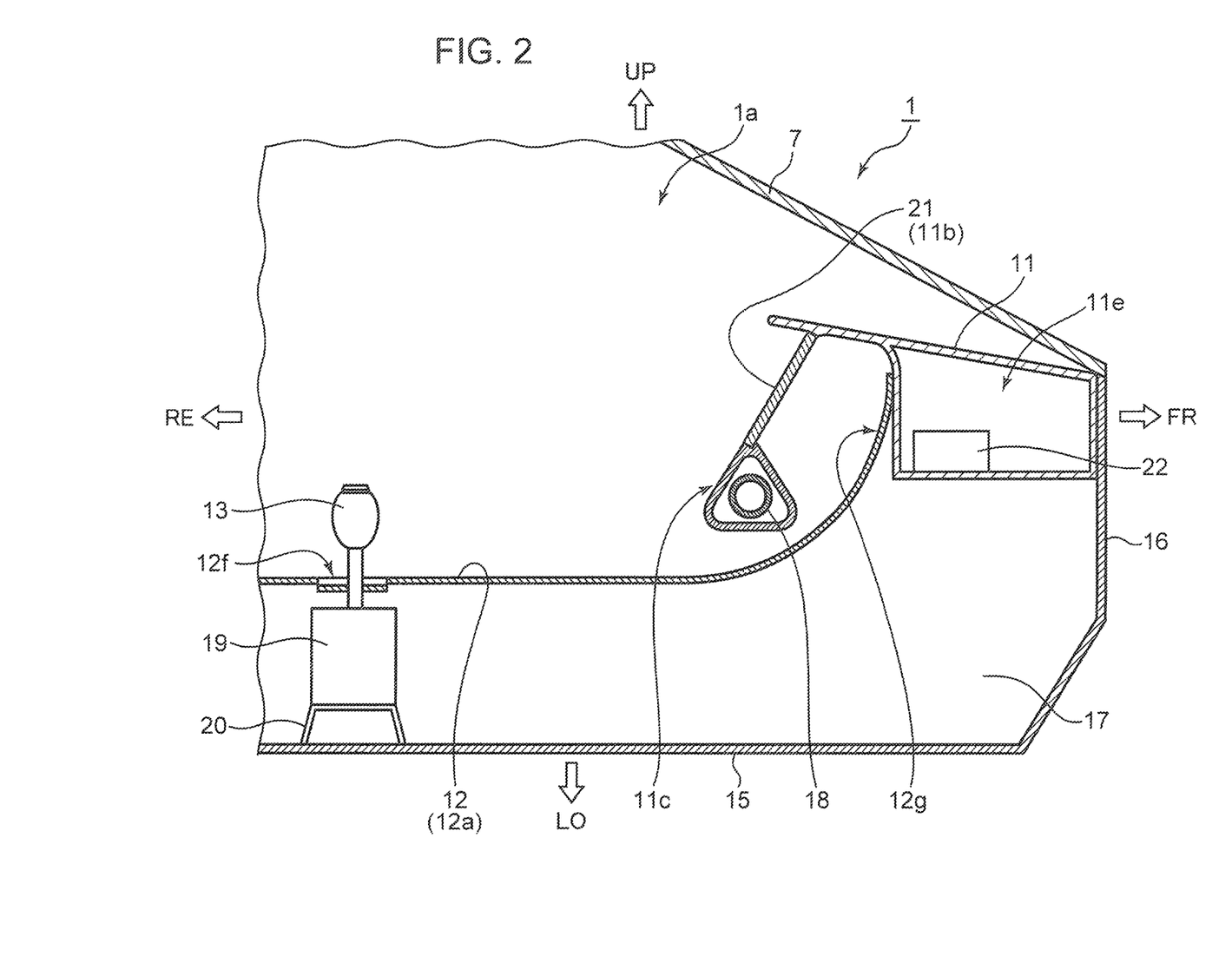
FIG. 2 is a schematic sectional view taken along II-II in FIG. 1, which shows an arrangement relation between a transparent display and a center console.

An arrangement relation of the center console 12 with respect to the instrument panel 11 will be described with reference FIG. 2. FIG. 2 is a schematic sectional view showing a section taken along II-II in FIG. 1.

As shown in FIG. 2, the vehicle 1 is provided with a floor panel 15 forming a lower portion of the vehicle compartment 1a and a dash panel 16 forming a front portion of the vehicle compartment 1a. The center console 12 is provided to extend from the rear side of the vehicle to the front side of the vehicle on the floor panel 15. A recessed portion 12f which is recessed to the floor panel 15 side is provided in a part in which the shift knob 13 is disposed in the center console 12. A shift lever linking the shift knob 13 and a shift unit 19 disposed thereunder is inserted into an opening portion opened in the recessed portion 12f.

As shown in FIG. 2, the shift unit 19 is disposed in the floor panel 15 via a base 20. The shift unit 19 may be placed directly on the floor panel 15.

The center console 12 has a front side of the vehicle going under the trim portion 11c of the instrument panel 11 (three-dimensionally crossed) to reach a back side of the information portion 11b (in the front side of the vehicle). In the present embodiment, a part formed extending around the back side of the information portion 11b in the center console 12 is referred to as an extending portion 12g.

A heater unit 17 is provided in a part below the extending portion 12g and on the front side of the vehicle. The heater unit 17 is provided only in a central portion in the vehicle width direction below the instrument panel 11 but does not extend to the front of the driver's seat and the passenger's seat.

The trim portion 11c under which the center console 12 passes has a cross car beam 18 housed therein. The cross car beam 18 is a structural member bridging pillars.

In the present embodiment, the information portion 11b of the instrument panel 11 is configured with a transparent display 21. The transparent display 21 is capable of displaying characters and images, and at least in a state of displaying nothing, enters a light transmission state. Specifically, in a state where the transparent display 21 displays no information, the driver is allowed to visually recognize the extending portion 12g of the center console 12 through the transparent display 21.

A driver module 22 is housed in an internal space 11e of the instrument panel 11 for driving and controlling the transparent display 21. The transparent display 21 and the driver module 22 are connected by a signal line not shown.

In the vehicle 1 according to the present embodiment, for example, a liquid crystal transparent display, an organic EL transparent display, and an inorganic EL transparent display can be adopted as the transparent display 21.

3. Disposition of Instruction Input Portion 23 in Center Console 12

Figure 3:
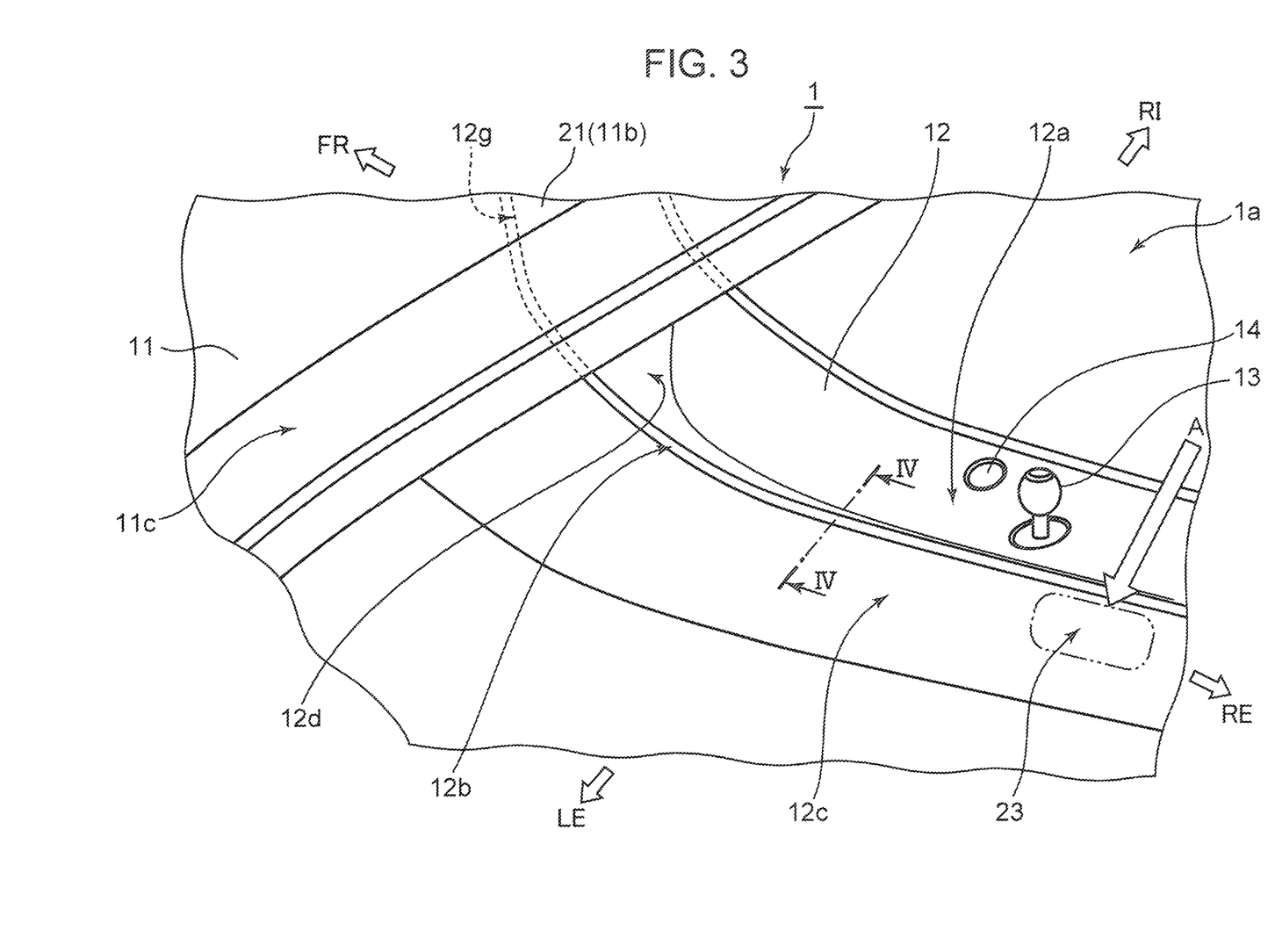
FIG. 3 is a schematic perspective view showing an instruction input portion provided in an outer-side outer surface portion of the center console.

Disposition of an instruction input portion 23 in the center console 12 will be described with reference to FIG. 3. FIG. 3 is a schematic perspective view showing a position where the instruction input portion 23 is disposed in the center console 12.

As shown in FIG. 3, the instruction input portion 23 which accepts driver's input operation is provided in the outer-side outer surface portion 12c of the center console 12 on the passenger's seat side. The instruction input portion 23 is disposed slightly forward of a front end portion of the passenger's seat 3 in the vehicle as indicated by arrow A.

The instruction input portion 23 is a part which accepts input operation related to display information of the information portion 11b by a passenger such as a driver. The instruction input portion 23 is configured to have an outer face of the same surface design and texture as those of the outer-side outer surface portion 12c of the center console 12. The instruction input portion 23 is, for example, an electrostatic capacitance type touch panel.

Also in the center console 12, inward of the outer-side upper end surface portion 12b, a linear light emission module (a light emission portion) is disposed. The linear light emission module is formed from a position near the instruction input portion 23 to the extending portion 12g.

4. Configuration and Light Emission Mode of Light Emission Module 24

Figure 4:
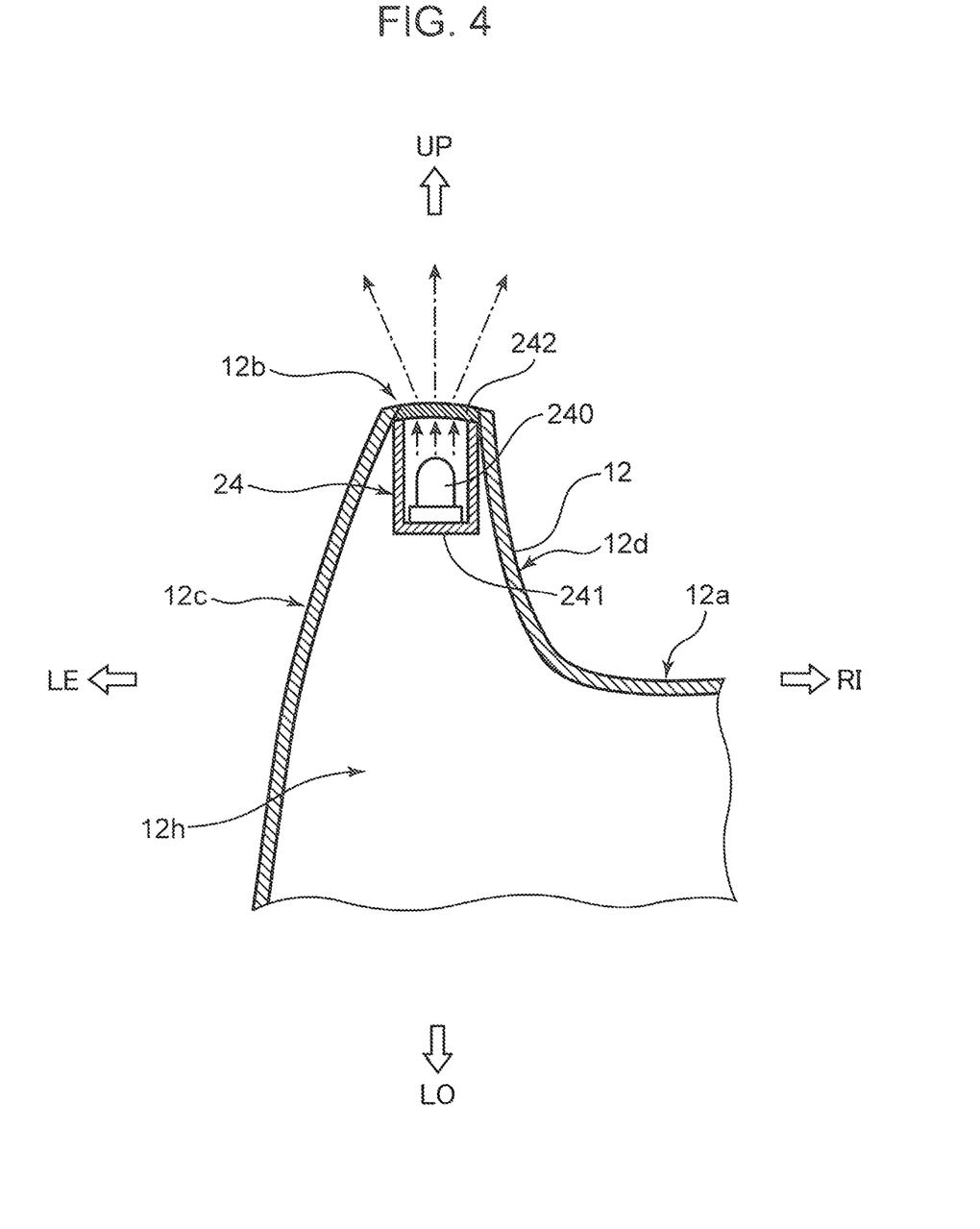
FIG. 4 is a schematic sectional view taken along IV-IV in FIG. 3, which shows a configuration of a light emission module provided in an outer-side upper end surface portion of the center console.
Figure 5:
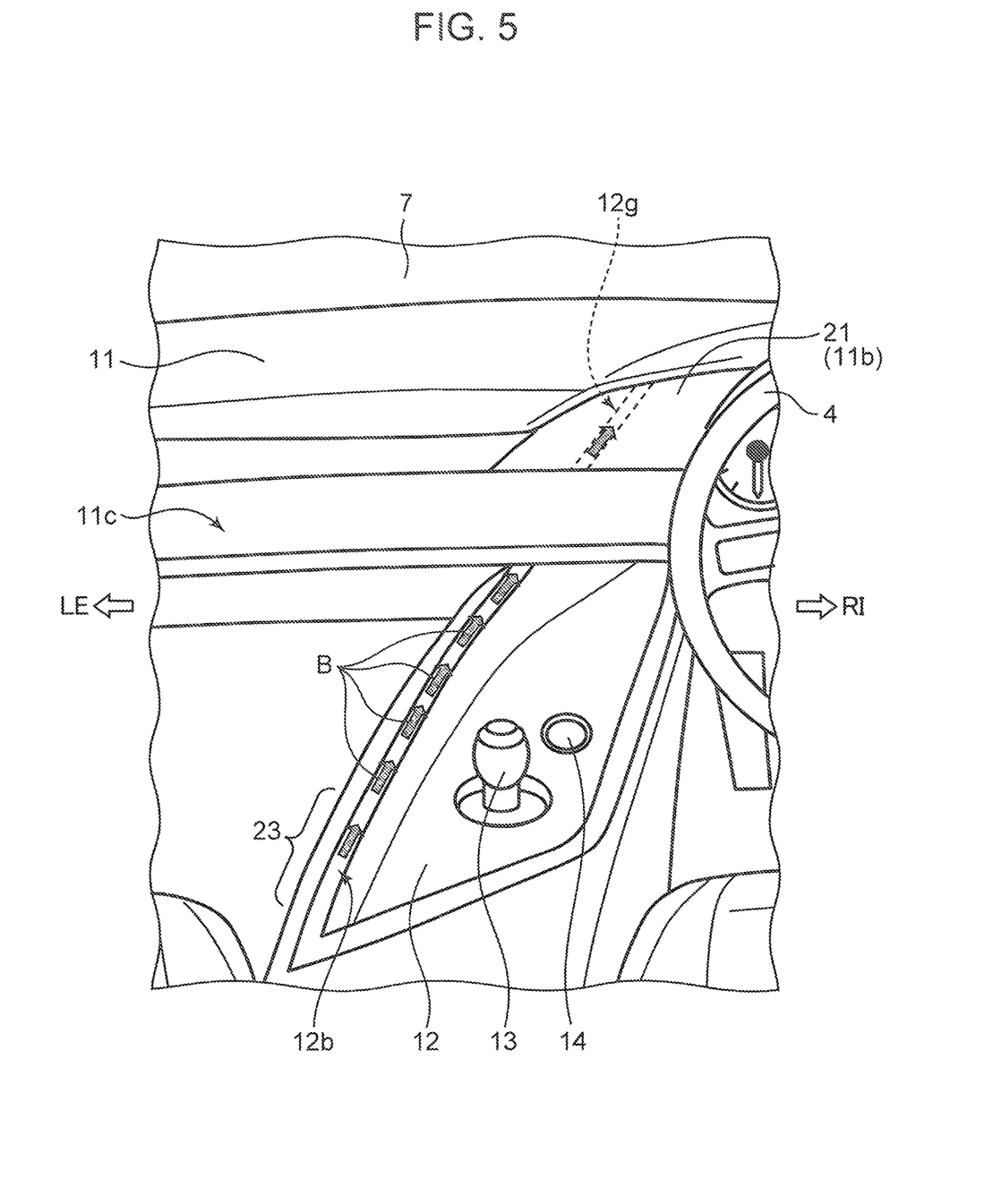
FIG. 5 is a schematic view showing a lighting mode of the light emission module in the center console when a passenger conducts input operation to the instruction input portion.

A configuration and a light emission mode of a light emission module 24 provided in the center console 12 will be described with reference to FIGS. 4 and 5. FIG. 4 is a schematic sectional view showing a section taken along IV-IV in FIG. 3, and FIG. 5 is a schematic view showing a light emission mode of the light emission module 24.

As shown in FIG. 4, a space 12h is provided inward of the center console 12. Then, the light emission module 24 is disposed below the outer-side upper end surface portion 12b in the space 12h. The light emission module 24 has a light emitting diode (LED) 240, a case 241 housing the LED 240, and a diffusing plate 242 which blocks an upper opening of the case 241. Then, the diffusing plate 242 forms the outer-side upper end surface portion 12b of the center console 12.

The diffusing plate 242 is configured to function also as a half mirror and when the LED 240 does not light, to prevent the LED 240 from being visually recognized from outside.

When the LED 240 emits light in response to instruction input operation to the instruction input portion 23 (see FIG. 3) by the passenger, the light is diffused in a wide angle by the diffusing plate 242 so as to be emitted upward and obliquely upward of the center console 12. In other words, the light emission module 24 is provided for answering back to an instruction input to the instruction input portion 23 by the passenger.

In FIG. 4, which is illustrated as an extracted part of the light emission module 24, the light emission module 24 is linearly provided along the outer-side upper end surface portion 12b of the center console 12, in which a plurality of the LEDs 240 are continuously provided.

As shown in FIG. 5, when the passenger (driver) inputs an instruction to the instruction input portion 23, the light emission module 24 provided in the outer-side upper end surface portion 12b of the center console 12 serially lights (sequentially lights) from a part near the instruction input portion 23 toward the extending portion 12g as indicated by arrow B.

A light emission brightness of the light emission module 24 is set to be a brightness not inviting excessive glare on the front window shield 7 and not hindering driving.

5. Display Drive of Transparent Display 21 and Lighting of Light Emission Module 24

Figure 6:
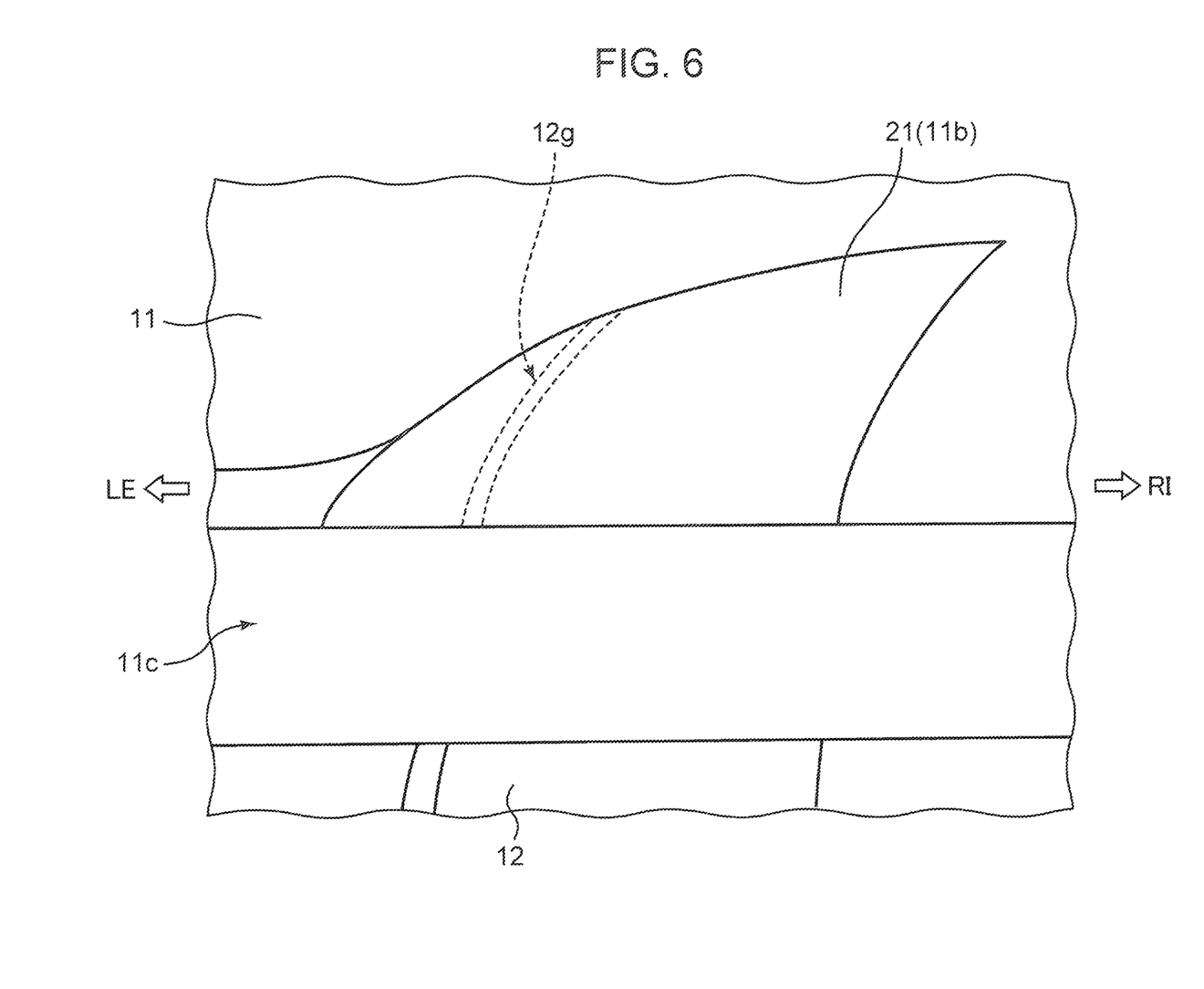
FIG. 6 is a schematic view showing a state where the transparent display is not in display drive.

Description will be made of display drive of the transparent display 21 and lighting of the light emission module 24 with reference to FIGS. 6 and 7. FIG. 6 is a schematic view showing a configuration of the transparent display 21 and surroundings thereof in a state where the transparent display 21 is not in display drive, and FIG. 7 is a schematic view showing the configuration of the transparent display 21 and the surroundings thereof in a state where the transparent display 21 is in display drive.

First, as shown in FIG. 6, when the transparent display 21 is not in display drive with neither information of characters nor information of images displayed on the transparent display 21, the transparent display 21 is in a state of allowing light transmission (transparent state). Therefore, a passenger such as a driver is allowed to visually recognize, through the transparent display 21, the extending portion 12g of the center console 12 provided in the back of the transparent display 21.

When the transparent display 21 is not in display drive as shown in FIG. 6, the above-described sequential lighting of the light emission module 24 can be visually recognized as well.

Figure 7:
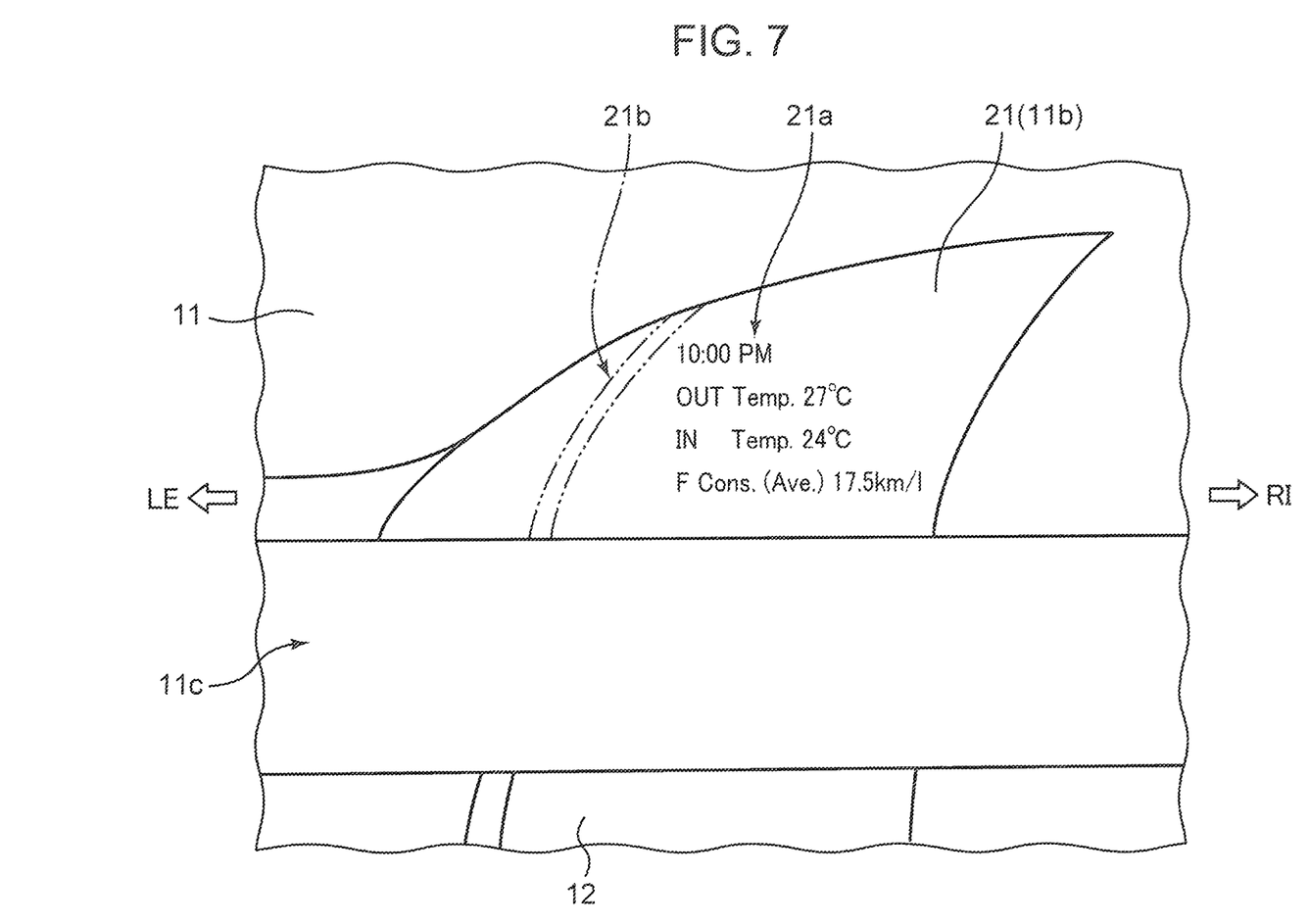
FIG. 7 is a schematic view showing a state where the transparent display is in display drive.

Next, when the transparent display 21 is in display drive as shown in FIG. 7, characters and images are displayed on the transparent display 21 (FIG. 7 shows a state where only characters are displayed). In this state, the transparent display 21 does not transmit light, thereby preventing a passenger from visually recognizing the extending portion 12g of the center console 12. This enables a passenger to reliably check various kinds of information displayed on the transparent display 21.

Information displayed on the transparent display 21 includes information indication recognized by characters and images (a character and image display unit 21a), and a line displayed in a part frontward of the extending 12g (a line display portion 21b).

The line displayed in the line display portion 21b is a line corresponding to light emission of the light emission module 24 in the extending portion 12g of the center console 12. This enables, even when display drive of the transparent display 21 prevents the extending portion 12g from being visually recognized, light emission by the light emission module 24 which have been visually recognized in a preceding stage to be correlated with images displayed on the transparent display 21. In other words, it is possible to visually recognize that display of characters and images on the transparent display 21 is based on instruction input operation conducted before by the passenger to the instruction input portion 23.

6. Shape of Center Console 12

As described above, the outer-side outer surface portion 12c and the like of the center console 12 are configured to have inclination angles thereof changing in a front-rear direction of the vehicle, and a shape of the center console 12, in particular, a shape of a part of the center console 12 on the passenger's seat 3 side will be described with reference to FIGS. 8 and 9.

Figure 8:
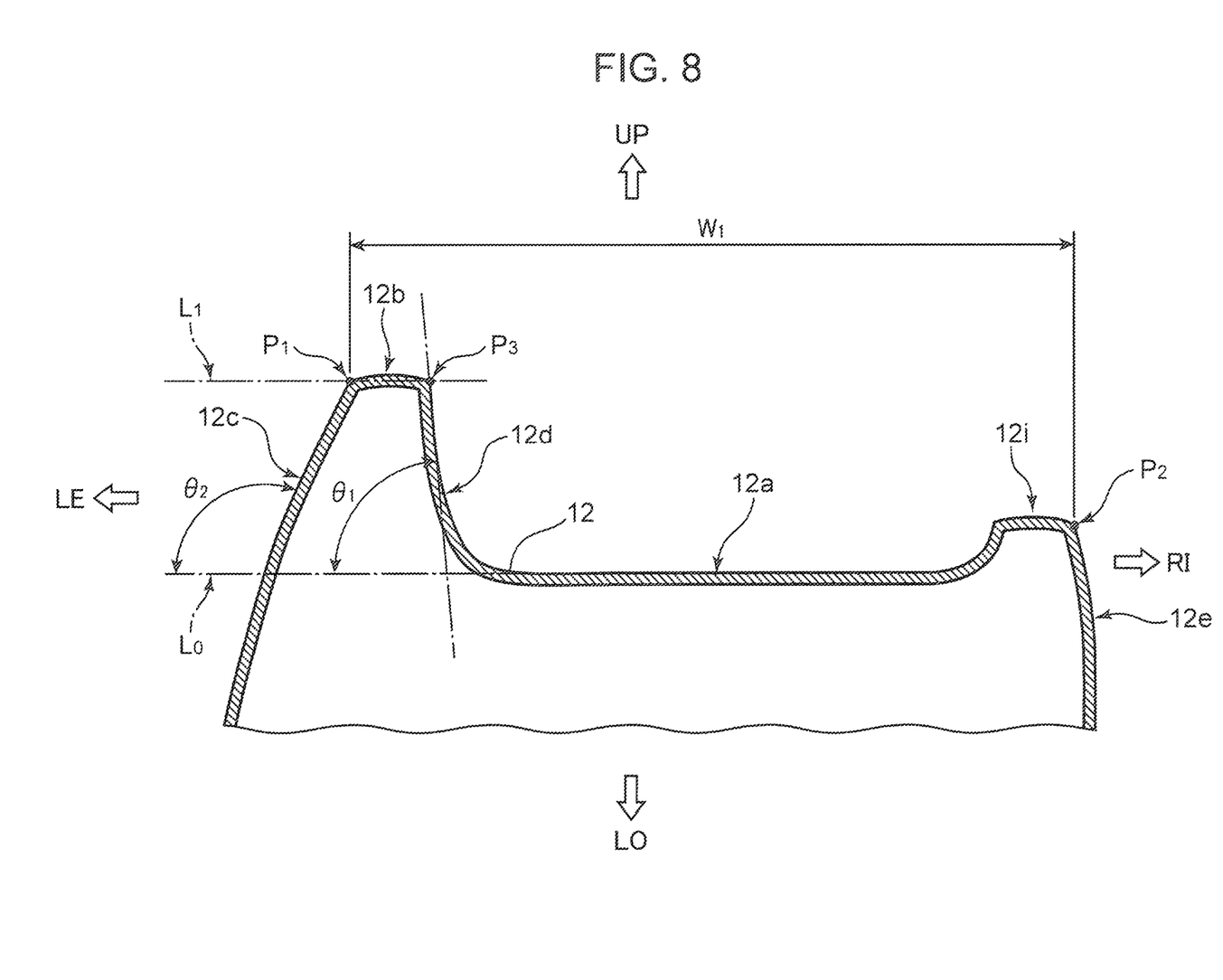
FIG. 8 is a schematic sectional view taken along VIII-VIII in FIG. 1, which shows an outer shape of the center console on a rear side of the vehicle.
Figure 9:
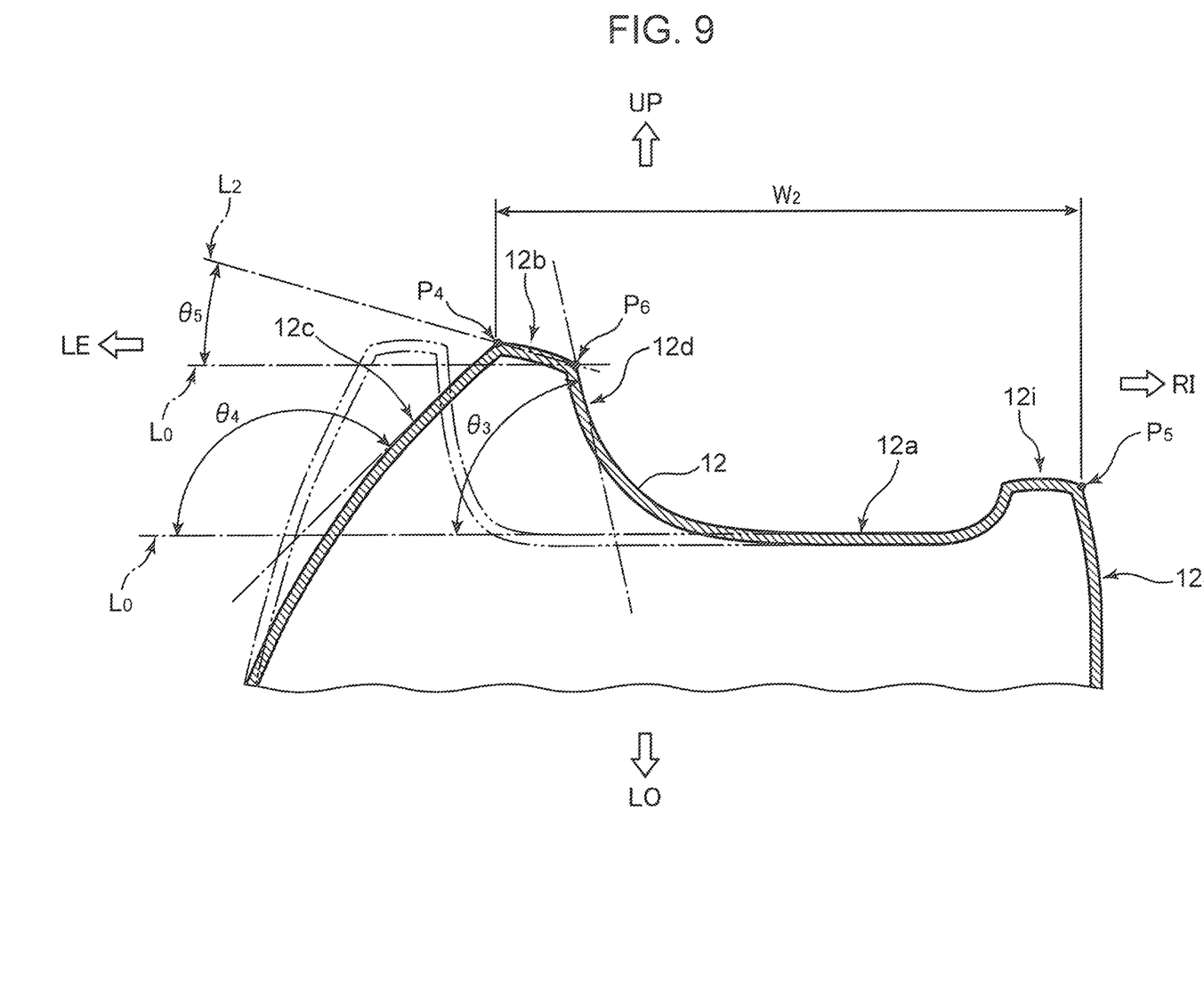
FIG. 9 is a schematic sectional view taken along IX-IX in FIG. 1, which shows the outer shape of the center console on a front side of the vehicle.

FIG. 8 is a schematic sectional view showing a section taken along VIII-VIII in FIG. 1, and FIG. 9 is a schematic sectional view showing a section taken along IX-IX in FIG. 1.

As shown in FIG. 8, the center console 12 is configured such that in a part slightly forward of the position of the shift knob 13, the outer-side outer surface portion 12c is angled at $\theta_2$ with respect to a horizontal surface $L_0$.

Also in the part shown in FIG. 8, the outer-side inner surface portion 12d is configured to be angled at $\theta_1$ with respect to the horizontal surface $L_0$. The angle $\theta_1$ and the angle $\theta_2$ satisfy the following relation.

$$\theta_1 < \theta_2 \quad \text{(Formula 1)}$$

Here, an upper face of the main face portion 12a of the center console 12 is configured to be horizontal when the vehicle 1 is at a flat place.

Additionally, an imaginary line $L_1$ is assumed which links abutting positions $P_1$ and $P_3$ of the outer side upper end surface portion 12b with the outer-side outer surface portion 12c and with the outer-side inner surface portion 12d, respectively. The imaginary line $L_1$ is generally parallel to the horizontal surface $L_0$. In other words, at the position shown in FIG. 8, the outer-side upper end surface portion 12b vertically faces up.

As shown in FIG. 8, a distance between the abutting position $P_1$ between the outer-side outer surface portion 12c and the outer-side upper end surface portion 12b and an abutting position $P_2$ between the inner-side outer surface portion 12e and an inner-side upper end surface portion 12i, that is, a width of an upper end portion of the center console 12, is a width $W_1$.

Next, as shown in FIG. 9, the center console 12 is configured such that in a part more forward of the position in the vehicle shown in FIG. 8, the outer-side outer surface portion 12c is angled at $\theta_4$ with respect to the horizontal surface $L_0$.

Also in a part shown in FIG. 9, the outer-side inner surface portion 12d is configured to be angled at $\theta_3$ with respect to the horizontal surface $L_0$. The angle $\theta_3$ and the angle $\theta_4$ satisfy the following relation.

$$\theta_3 < \theta_4 \quad \text{(Formula 2)}$$

An imaginary line $L_2$ is also assumed which links abutting positions $P_4$ and $P_6$ of the outer-side upper end surface portion 12b with the outer-side outer surface portion 12c and with the outer-side inner surface portion 12d, respectively. The imaginary line $L_2$ inclines at an angle of $\theta_5$ with respect to the horizontal surface $L_0$. In other words, in a part shown in FIG. 9, the outer-side upper end surface portion 12b inclines to the driver's seat 2 side in a vertical direction. This makes the center console 12 twisted to the driver's seat 2 side.

The outer-side upper end surface portion 12b is configured to have an inclination gradually increasing.

As shown in FIG. 9, a distance between the abutting position $P_4$ between the outer-side outer surface portion 12c and the outer-side upper end surface portion 12b, and an abutting position $P_5$ between the inner-side outer surface portion 12e and the inner-side upper end surface portion 12i (a width of the upper end portion of the center console 12) is a width $W_2$.

The angle $\theta_5$ is set to gradually change within a range of, for example, 0° to 90°, more preferably a range of 0° to 60°. The angle $\theta_5$ is preferably within an angle range in which a driver can visually recognize an emitted light of the light emission module 24 in an entire area of the center console 12 in a longitudinal direction (in the front-rear direction of the vehicle) including the extending portion 12g.

Comparison in the center console 12 between the part shown in FIG. 8 and the part shown in FIG. 9 finds that the following relations are satisfied.

$$\theta_1 > \theta_3 \quad \text{(Formula 3)}$$

$$\theta_2 < \theta_4 \quad \text{(Formula 4)}$$

$$W_1 > W_2 \quad \text{(Formula 5)}$$

The center console 12 with such a shape as satisfies the foregoing relations has three-dimensional sophisticated sculpturing and is effective in expressing high designability of the vehicle compartment 1a of the vehicle 1.

Also, since the center console 12 is set to satisfy the relation of the Formula 5 in the front-rear direction of the vehicle, so that the outer-side upper end surface portion 12b is configured to be located to the driver side toward the front side of the vehicle, the driver is given impression that the center console 12 extends radially from the focus of expansion. This is effective in relieving driver's fatigue during driving.

Since in the vehicle 1, the arm rest 9c of the side door 9 on the driver side is also configured to give a driver an impression that the arm rest 9c extends radially from the focus of expansion as described above, this configuration produces more effects to relieve driver's fatigue during driving in combination with the shape of the center console 12.

7. Effects

In the vehicle compartment 1a of the vehicle 1 according to the present embodiment, the center console 12 has the extending portion 12g formed extending around a back side (the front side of the vehicle 1) of the transparent display 21 (the information portion 11b), and the transparent display 21 enters the light transmission state at least when the transparent display 21 is not in display drive. Accordingly, when neither information of characters nor information of images is displayed on the transparent display 21, the driver can visually recognize the extending portion 12g of the center console 12 through the transparent display 21, so that the driver can actually feel that the center console 12 is disposed to a position more forward (to the back side) of the vehicle 1 than the instrument panel 11 is.

Accordingly, the vehicle compartment 1a of the vehicle 1 according to the present embodiment enables a passenger to actually feel that the center console 12 is provided in accordance with a driving direction of the vehicle 1, and to feel spaciousness which causes the passenger to feel the vehicle compartment 1a comfortable and spacious without adding a decorating part to an existing structural part.

Additionally, since the information portion 11b in the instrument panel 11 is configured with the transparent display 21, the vehicle compartment 1a of the vehicle 1 according to the present embodiment enables not only character information but also image information to be displayed and is therefore excellent in terms of performance of transmitting information to a passenger.

Also, since in the vehicle compartment 1a of the vehicle 1 according to the present embodiment, the center console 12 and the trim portion 11c of the instrument panel 11 are three-dimensionally crossed, the relevant part in the vehicle compartment 1a and surroundings thereof can be three-dimensionally presented to allow a passenger to further feel spaciousness of the vehicle compartment 1a.

Additionally, since in the vehicle compartment 1a of the vehicle 1 according to the present embodiment, the outer-side upper end surface portion 12b of the center console 12 is provided with the linear light emission module 24, and the light emission module 24 extends from the proximity of the instruction input portion 23 to the extending portion 12g, when a passenger conducts input operation to the instruction input portion 23 by light emission by the LED 240 in the light emission module 24, answer back to the passenger can be conducted by light.

Also, since in the vehicle compartment 1a of the vehicle 1 according to the present embodiment, the light emission module 24 is designed to serially light (sequentially light), it is possible to make a passenger become aware of a correlation between instruction input operation to the instruction input portion 23 by the passenger and display of information on the transparent display 21. This realizes more excellent designability of the vehicle compartment 1a of the vehicle 1.

Additionally, since in the vehicle compartment 1a of the vehicle 1 according to the present embodiment, light emitted from a part of the light emission module 24, the part being provided in the extending portion 12g, is visually recognizable at least when the transparent display 21 is not displaying information, it is possible to reliably make passengers including a driver become aware that the center console 12 continues to the extending portion 12g.

Since in the vehicle compartment 1a of the vehicle 1 according to the present embodiment, the outer surface portion (the outer-side outer surface portion 12c) and the outer-side upper end surface portion 12b in the center console 12 on the passenger's seat 3 side satisfy the relation of the above Formula 5, and are designed to be gradually located closer to the driver's seat 2 side (draw near to the driver's seat 2 side) toward the front side of the vehicle 1 (the extending portion 12g side) from the rear side of the vehicle 1 (the part between the driver's seat 2 and the passenger's seat 3), the driver is allowed to feel like being in a "cockpit" when sitting on the driver's seat 2. In particular, by defining configurations of the outer-side outer surface portion 12c and the outer-side upper end surface portion 12b in the center console 12 in consideration of a relation with a focus of expansion when the vehicle 1 advances, driver's fatigue can be relieved more reliably.

Further, since in the vehicle compartment 1a of the vehicle 1 according to the present embodiment, the upper end surface portion (the outer-side upper end surface portion 12b) in the center console 12 on the passenger's seat 3 side is provided in a state (twisted state) of increasing an inclination toward the front side of the vehicle as described with reference to FIGS. 8 and 9, the center console 12 can be presented with high sculpturing and high designability. Additionally, by making the center console 12 have a twisted structure as a whole in which the outer-side upper end surface portion 12b in the center console 12 gradually increases an inclination thereof toward the front side of the vehicle as described above, togetherness and feeling of a cockpit around the driver's seat 2 can be presented.

Modification

While in the above embodiment, the center console 12 is adopted as one example of an interior member, the present invention is not limited thereto. Various members adopted as an interior of the vehicle compartment can be adopted as "an interior member". While it can be assumed, for example, that in a vehicle with a large inner width of a vehicle compartment, a member other than a center console is provided for a driver on an inner side in the vehicle width direction, the member can be used as an interior member of the present invention.

While in the above embodiment, the driver's seat 2 is disposed on the right side in the vehicle width direction and the passenger's seat 3 is disposed on the left side, the present invention is not limited thereto. The driver's seat may be disposed on the left side in the vehicle width direction and the passenger's seat may be disposed on the right side.

In a case where the driver's seat is disposed on the left side in the vehicle width direction, the same effect as the above effect can be obtained by reversing the shape of the center console 12, in particular, the plane shape in the above embodiment in the right-left direction.

While in the above embodiment, the instruction input portion 23 is provided in a part of the outer-side outer surface portion 12c in the center console 12, the present invention is not limited thereto. For example, the instruction input portion may be provided on the main face portion 12a of the center console 12 or the instruction input portion may be provided in the inner-side outer surface portion 12e.

Although in the above embodiment, a touch panel is adopted as the instruction input portion 23, the present invention is not limited thereto. For example, a dial type input portion or a push-button type input portion can be used.

While the above embodiment adopts, as one example, the vehicle 1 including the accelerator pedal 5 and the brake pedal 6 in the vehicle compartment 1a, the present invention is not limited thereto. For example, it goes without saying that the same effect as the above can be obtained by applying the above configuration to a vehicle including a clutch pedal in addition to an accelerator pedal and a brake pedal.

Although in the above embodiment, a relation between a surface pattern and texture of the center console 12 and a surface pattern and texture of the arm rest 9c in the side door 9 is not mentioned in particular, making both the same enables a compartment design to have togetherness and enables higher designability to be exhibited.

While in the above embodiment, the trim portions 11c and 11d of the instrument panel 11 are configured not to have a function of displaying characters or images, the present invention is not limited thereto. For example, the trim portion may also be formed using a display capable of displaying characters and images, such that in a state where no information is displayed on the trim portion, leather-like, carbon-like, or woodgrain-like patterns can be visually recognized, and when information is displayed on the display, characters and images can be displayed on the surface of the trim portion.

While the above embodiment has been described with the meter cluster portion 11a and the information portion 11b provided as separate parts in the instrument panel 11, these portions can be configured also with one display (transparent display).

Conclusion

The vehicle includes a driver's seat and a passenger's seat disposed on a floor panel so as to be spaced from each other in a vehicle width direction; an interior member disposed to extend from between the driver's seat and the passenger's seat toward a front side of the vehicle; and an instrument panel disposed below a front window shield to extend in the vehicle width direction, and having a meter cluster portion disposed in front of a steering wheel and an information display portion disposed closer to a center in the vehicle width direction than the meter cluster portion, in which the interior member has, on the front side of the vehicle, a extending portion extending around a back side of the information display portion so as to be spaced from the information display portion, and the information display portion has a panel capable of displaying at least either one information of images or characters, and at least when the information is not displayed, enters a light transmission state so as to allow a driver to visually recognize the extending portion.

In the above vehicle, the interior member has the extending portion extending around the back side (the front side of the vehicle) of the information display portion, and at least when information is not displayed on the information display portion, the information display portion enters the light transmission state. Accordingly, when no information is displayed on the information display portion, a driver can visually recognize the extending portion of the interior member through the information display portion in the light transmission state, and therefore can actually and visually feel that the interior member is disposed to a position in the front side of the vehicle where the instrument panel is provided.

Accordingly, the above vehicle enables a passenger to actually feel togetherness that the interior member is provided in accordance with a driving direction of the vehicle, and to feel spaciousness which causes the passenger to feel the vehicle compartment comfortable and spacious without adding a decorating part to an existing structural part.

In the above vehicle, the information display portion is preferably configured with a transparent display.

The above vehicle is excellent in terms of information transmission performance to a passenger because a transparent display is adopted as the above information display portion to enable not only character information but also image information to be displayed.

As a transparent display, for example, not only a liquid crystal transparent display but also an organic electroluminescence (EL) transparent display and an inorganic EL transparent display can be adopted.

The above vehicle preferably adopts a configuration in which the instrument panel further has a trim portion provided to pass below the information display portion and extend in the vehicle width direction, and the interior member three-dimensionally crosses below the trim portion to extend to the front side of the vehicle.

Since in the above vehicle, the interior member and the trim portion are three-dimensionally crossed, a vehicle compartment structure can be three-dimensionally presented to allow a passenger to further feel spaciousness of the vehicle compartment.

The above vehicle preferably adopts a configuration in which the interior member has an instruction input portion which accepts input related to display information in the information display portion, and a light emission portion which is linear and is provided to extend from the proximity of the instruction input portion to the extending portion.

Since in the above vehicle, the interior member is provided with the light emission portion which is linear, and the light emission portion extends from a proximity of the instruction input portion to the extending portion, when a passenger conducts input operation to the instruction input portion with light from the light emission portion, answer back to the passenger can be conducted by light.

The above vehicle preferably adopts a configuration in which the light emission portion has a plurality of light emission modules disposed along a longitudinal direction to enable serial lighting in the longitudinal direction.

Since in the above vehicle, the light emission portion is configured to be capable of serially lighting (sequentially lighting), it is possible to make a passenger become aware of a correlation between passenger's input operation and display of information on the information display portion. This realizes more excellent designability of the vehicle compartment structure of the vehicle.

The above vehicle preferably adopts a configuration in which a part of the light emission portion provided in the extending portion is visually recognizable by a driver at least when the information display portion does not display the information.

Since in the above vehicle, light emitted from the light emission portion provided in the extending portion is visually recognizable at least when the information display portion is not displaying information, it is possible to reliably make passengers including a driver become aware that the interior member continues to the extending portion.

The above vehicle preferably adopts a configuration in which an outer surface portion of the interior member on a side of the passenger's seat is provided to be gradually located closer to a side of the driver's seat toward the extending portion from between the driver's seat and the passenger's seat.

Since in the above vehicle, the outer surface portion of the interior member on the side of the passenger's seat is designed to be gradually located closer to the side of the driver's seat (draw near to the side of the driver's seat) toward the front side of the vehicle (the extending portion) from the rear side of the vehicle (the part between the driver's seat and the passenger's seat), the driver is allowed to feel like being in a "cockpit" when sitting on the driver's seat. In particular, by defining configuration of the outer surface portion of the interior member on the side of the passenger's seat in consideration of a relation with a focus of expansion when the vehicle advances, driver's fatigue can be relieved more reliably.

The above vehicle preferably adopts a configuration in which an upper end surface portion of the interior member on the side of the passenger's seat is provided to gradually increase an inclination of the upper end surface portion toward the side of the driver's seat from between the driver's seat and the passenger's seat toward the extending portion.

Since in the above vehicle, the upper end surface portion of the interior member on the side of the passenger's seat is provided in a state (twisted state) of increasing the inclination, high sculptural capacity of the interior member can be presented and high designability can be exhibited. Additionally, by making the interior member have a twisted structure as a whole in which the upper end surface portion of the interior member on the side of the passenger's seat gradually increases an inclination of the upper end surface portion toward the front side of the vehicle as described above, togetherness and feeling of a cockpit around the driver's seat can be presented.

Additionally, a vehicle includes a driver's seat and a passenger's seat disposed on a floor panel so as to be spaced from each other in a vehicle width direction; an interior member disposed to extend from between the driver's seat and the passenger's seat toward a front side of the vehicle; and an instrument panel disposed below a front window shield to extend in the vehicle width direction, and having a meter cluster portion disposed in front of a steering wheel and an information display portion disposed closer to a center in the vehicle width direction than the meter cluster portion, in which the interior member has, on the front side of the vehicle, a extending portion extending around a back side of the information display portion so as to be spaced from the information display portion, the information display portion has a panel capable of displaying at least either one information of images or characters, and at least when the information is not displayed, enters a light transmission state so as to allow a driver to visually recognize the extending portion, the information display portion is configured with a transparent display, the instrument panel further has a trim portion provided to pass below the information display portion and extend in the vehicle width direction, and the interior member three-dimensionally crosses below the trim portion to extend to the front side of the vehicle.

In the above vehicle, the interior member has the extending portion extending around the back side (the front side of the vehicle) of the information display portion, and at least when information is not displayed on the information display portion, the information display portion enters the light transmission state. Accordingly, when no information is displayed on the information display portion, a driver can visually recognize the extending portion of the interior member through the information display portion in the light transmission state, and therefore can actually and visually feel that the interior member is disposed to a position in the front side of the vehicle where the instrument panel is provided.

The above vehicle is excellent in terms of information transmission performance to a passenger because a transparent display is adopted as the above information display portion to enable not only character information but also image information to be displayed.

As a transparent display, for example, not only a liquid crystal transparent display but also an organic electroluminescence (EL) transparent display and an inorganic EL transparent display can be adopted.

Since in the above vehicle, the interior member and the trim portion are three-dimensionally crossed, a vehicle compartment structure can be three-dimensionally presented to allow a passenger to further feel spaciousness of the vehicle compartment.

Accordingly, the above vehicle enables a passenger to actually feel togetherness that the interior member is provided in accordance with a driving direction of the vehicle, and to feel spaciousness which causes the passenger to feel the vehicle compartment comfortable and spacious without adding a decorating part to an existing structural part.

The above vehicle preferably adopts a configuration in which an outer surface portion of the interior member on a side of the passenger's seat is provided to be gradually located closer to a side of the driver's seat toward the extending portion from between the driver's seat and the passenger's seat.

Since in the above vehicle, the outer surface portion of the interior member on the side of the passenger's seat is designed to be gradually located closer to the side of the driver's seat (draw near to the side of the driver's seat) toward the front side of the vehicle (the extending portion) from the rear side of the vehicle (the part between the driver's seat and the passenger's seat), the driver is allowed to feel like being in a "cockpit" when sitting on the driver's seat. In particular, by defining configuration of the outer surface portion of the interior member on the side of the passenger's seat in consideration of a relation with a focus of expansion when the vehicle advances, driver's fatigue can be relieved more reliably.

The above vehicle preferably adopts a configuration in which an upper end surface portion of the interior member on the side of the passenger's seat is provided to gradually increase an inclination of the upper end surface portion toward the side of the driver's seat from between the driver's seat and the passenger's seat toward the extending portion.

Since in the above vehicle, the upper end surface portion of the interior member on the side of the passenger's seat is provided in a state (twisted state) of increasing the inclination, high sculptural capacity of the interior member can be presented and high designability can be exhibited. Additionally, by making the interior member have a twisted structure as a whole in which the upper end surface portion of the interior member on the side of the passenger's seat gradually increases an inclination of the upper end surface portion toward the front side of the vehicle as described above, togetherness and feeling of a cockpit around the driver's seat can be presented.

As described in the foregoing, since each of the above vehicles enables spaciousness of a vehicle compartment to be realized, it is possible to relieve driver's fatigue and realize excellent designability.

This application is based on Japanese Patent application No. 2017-179833 filed in Japan Patent Office on Sep. 20, 2017, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:
1. A vehicle comprising:
a driver's seat and a passenger's seat disposed on a floor panel so as to be spaced from each other in a vehicle width direction;
an interior member disposed to extend from between the driver's seat and the passenger's seat toward a front side of the vehicle; and
an instrument panel disposed below a front window shield to extend in the vehicle width direction, and having a meter cluster portion disposed in front of a steering wheel and an information display portion disposed closer to a center in the vehicle width direction than the meter cluster portion,
wherein the interior member has, on the front side of the vehicle, an extending portion extending around a back side of the information display portion so as to be spaced from the information display portion, and
the information display portion has a panel capable of displaying at least either one information of images or characters, and at least when the information is not displayed, enters a light transmission state so as to allow a driver to visually recognize the extending portion.
2. The vehicle according to claim 1, wherein the information display portion is configured with a transparent display.

3. The vehicle according to claim 1, wherein
the instrument panel further has a trim portion provided to pass below the information display portion and extend in the vehicle width direction, and
the interior member three-dimensionally crosses below the trim portion to extend to the front side of the vehicle.

4. The vehicle according to claim 1, wherein
the interior member has an instruction input portion which accepts input related to display information in the information display portion, and a light emission portion which is linear and is provided to extend from a proximity of the instruction input portion to the extending portion.

5. The vehicle according to claim 4, wherein the light emission portion has a plurality of light emission modules disposed along a longitudinal direction, and is configured to enable serial lighting in the longitudinal direction.

6. The vehicle according to claim 5, wherein a part of the light emission portion provided in the extending portion is visually recognizable by a driver at least when the information display portion does not display the information.

7. The vehicle according to claim 4, wherein a part of the light emission portion provided in the extending portion is visually recognizable by a driver at least when the information display portion does not display the information.

8. The vehicle according to claim 2, wherein
the interior member has an instruction input portion which accepts input related to display information in the information display portion, and a light emission portion which is linear and provided to extend from a proximity of the instruction input portion to the extending portion.

9. The vehicle according to claim 3, wherein
the interior member has an instruction input portion which accepts input related to display information in the information display portion, and a light emission portion which is linear and provided to extend from a proximity of the instruction input portion to the extending portion.

10. The vehicle according to claim 1, wherein an outer surface portion of the interior member on a side of the passenger's seat is provided to be gradually located closer to a side of the driver's seat toward the extending portion from between the driver's seat and the passenger's seat.

11. The vehicle according to claim 2, wherein an outer surface portion of the interior member on a side of the passenger's seat is provided to be gradually located closer to a side of the driver's seat toward the extending portion from between the driver's seat and the passenger's seat.

12. The vehicle according to claim 3, wherein an outer surface portion of the interior member on a side of the passenger's seat is provided to be gradually located closer to a side of the driver's seat toward the extending portion from between the driver's seat and the passenger's seat.

13. The vehicle according to claim 4, wherein an outer surface portion of the interior member on a side of the passenger's seat is provided to be gradually located closer to a side of the driver's seat toward the extending portion from between the driver's seat and the passenger's seat.

14. The vehicle according to claim 1, wherein an upper end surface portion of the interior member on a side of the passenger's seat is provided to gradually increase an inclination of the upper end surface portion toward a side of the driver's seat from between the driver's seat and the passenger's seat toward the extending portion.

15. The vehicle according to claim 2, wherein an upper end surface portion of the interior member on a side of the passenger's seat is provided to gradually increase an inclination of the upper end surface portion toward a side of the driver's seat from between the driver's seat and the passenger's seat toward the extending portion.

16. The vehicle according to claim 3, wherein an upper end surface portion of the interior member on a side of the passenger's seat is provided to gradually increase an inclination of the upper end surface portion toward a side of the driver's seat from between the driver's seat and the passenger's seat toward the extending portion.

17. The vehicle according to claim 4, wherein an upper end surface portion of the interior member on a side of the passenger's seat is provided to gradually increase an inclination of the upper end surface portion toward a side of the driver's seat from between the driver's seat and the passenger's seat toward the extending portion.

18. A vehicle, comprising:
a driver's seat and a passenger's seat disposed on a floor panel so as to be spaced from each other in a vehicle width direction;
an interior member disposed to extend from between the driver's seat and the passenger's seat toward a front side of the vehicle; and
an instrument panel disposed below a front window shield to extend in the vehicle width direction, and having a meter cluster portion disposed in front of a steering wheel and an information display portion disposed closer to a center in the vehicle width direction than the meter cluster portion,
wherein the interior member has, on the front side of the vehicle, an extending portion extending around a back side of the information display portion so as to be spaced from the information display portion,
the information display portion has a panel capable of displaying at least either one information of images or characters, and at least when the information is not displayed, enters a light transmission state so as to allow a driver to visually recognize the extending portion,
the information display portion is configured with a transparent display,
the instrument panel further has a trim portion provided to pass below the information display portion and extend in the vehicle width direction, and
the interior member three-dimensionally crosses below the trim portion to extend to the front side of the vehicle.

19. The vehicle according to claim 18, wherein an outer surface portion of the interior member on a side of the passenger's seat is provided to be gradually located closer to a side of the driver's seat toward the extending portion from between the driver's seat and the passenger's seat.

20. The vehicle according to claim 18, wherein an upper end surface portion of the interior member on a side of the passenger's seat is provided to gradually increase an inclination of the upper end surface portion toward a side of the driver's seat from between the driver's seat and the passenger's seat toward the extending portion.

* * * * *